US012644489B2

(12) United States Patent
Zhang et al.

(10) Patent No.: US 12,644,489 B2
(45) Date of Patent: Jun. 2, 2026

(54) COMBINED GUIDE RAIL MECHANISM AND ITS APPLICATION IN VEHICLE BOX SLIDE-OUT SYSTEMS

(71) Applicants: Xinfang Zhang, Shanxi (CN); Xiaopu Zhang, Shanxi (CN)

(72) Inventors: Xinfang Zhang, Shanxi (CN); Xiaopu Zhang, Shanxi (CN)

( * ) Notice: Subject to any disclaimer, the term of this patent is extended or adjusted under 35 U.S.C. 154(b) by 11 days.

(21) Appl. No.: 18/798,812

(22) Filed: Aug. 9, 2024

(65) Prior Publication Data

US 2026/0043437 A1 Feb. 12, 2026

(51) Int. Cl.
| | |
|---|---|
| *F16H 19/04* | (2006.01) |
| *B60P 3/34* | (2006.01) |
| *F16C 29/06* | (2006.01) |
| *F16C 33/66* | (2006.01) |

(52) U.S. Cl.
CPC ............ *F16C 29/0604* (2013.01); *B60P 3/34* (2013.01); *F16C 33/6659* (2013.01); *F16H 19/04* (2013.01)

(58) Field of Classification Search
CPC .. F16C 29/0604; F16C 33/6659; F16H 19/04; B60P 3/34
USPC ......... 296/26.01, 8, 9, 12, 13, 164, 175, 176
See application file for complete search history.

(56) References Cited

U.S. PATENT DOCUMENTS

2017/0028898 A1* 2/2017 Garceau .................. F16H 35/18

FOREIGN PATENT DOCUMENTS

| CN | 112591182 B | * 4/2022 | ............. B65B 13/18 |
| CN | 111237420 B | * 8/2023 | ........... F16H 37/124 |

OTHER PUBLICATIONS

CN111237420TEXT (Year: 2023).*
CN112591182 Text (Year: 2022).*

* cited by examiner

*Primary Examiner* — Dennis H Pedder

(57) ABSTRACT

The present application relates to a combined guide rail mechanism and its use in a vehicle slide-out system, which includes a guide rail, a first guide, and a second guide. The guide rails contain multiple parallel rows of circulating balls, enabling the combined guide rail mechanism to achieve two-stage telescopic linear motion. A vehicle box slide-out system comprises the combined guide rail mechanism, a driving device, a support frame, a bearing box, and a slide-out box. This application achieves a two-stage extension, increases the usable space of the vehicle, and has an integrated mechanism setup that does not require disassembly of the vehicle's chassis. It is easy to install, needing only the slide-out box to be placed at the vehicle's opening, which is neat and aesthetically pleasing.

13 Claims, 13 Drawing Sheets

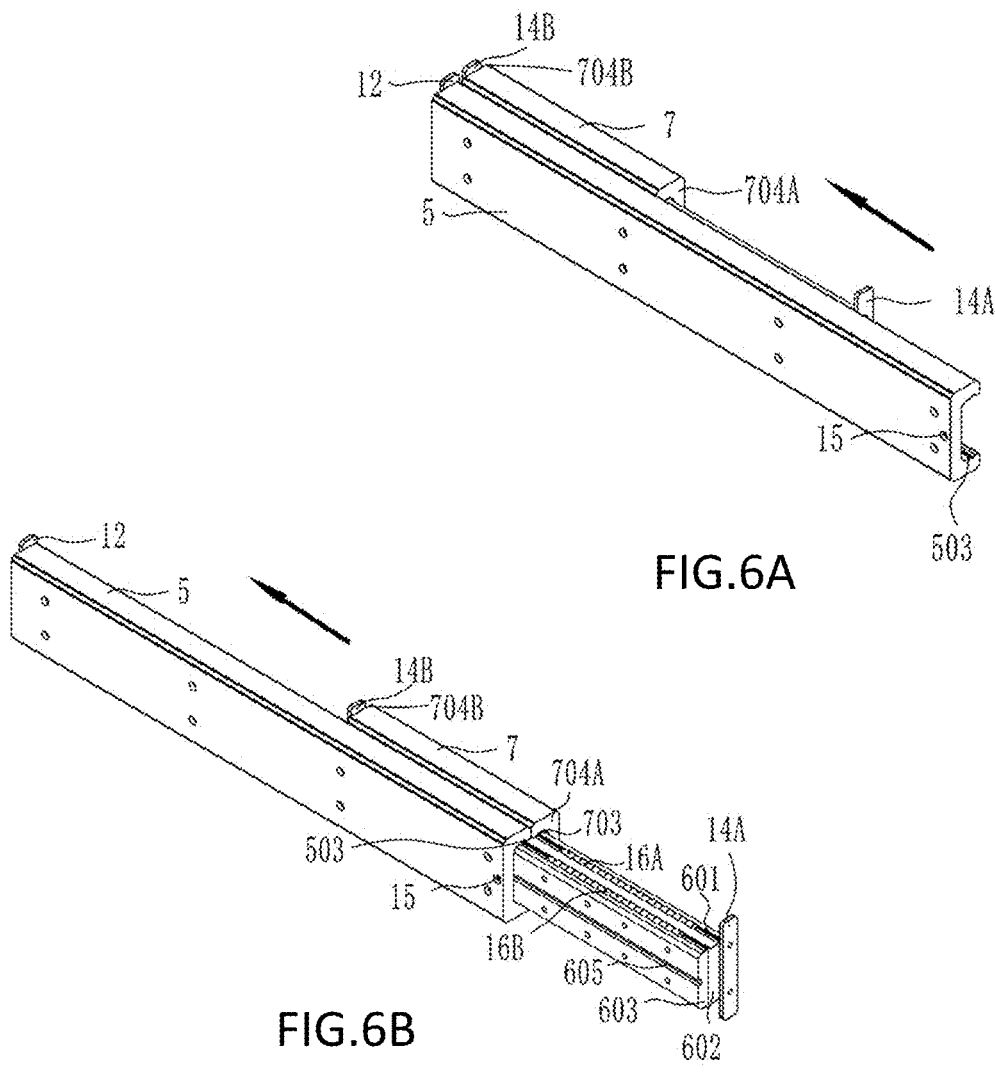
FIG.6A
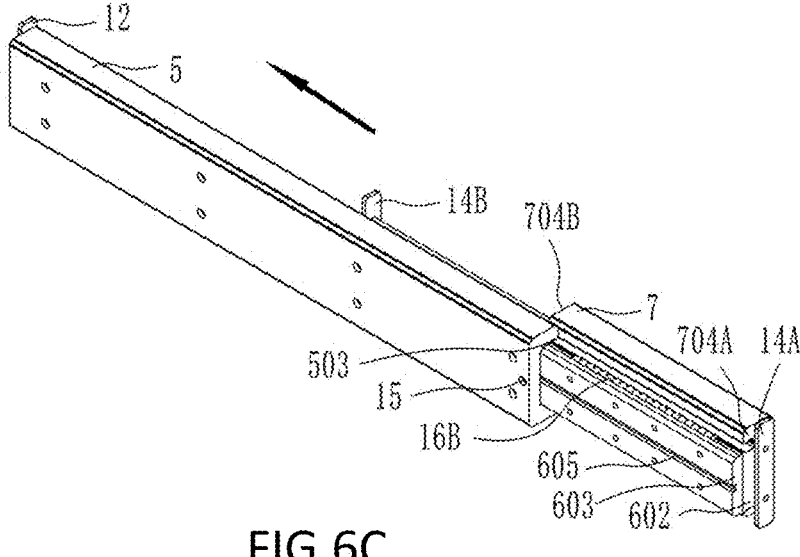
FIG.6B
FIG.6C

COMBINED GUIDE RAIL MECHANISM AND ITS APPLICATION IN VEHICLE BOX SLIDE-OUT SYSTEMS

TECHNICAL FIELD

The present invention relates to the field of mechanical linear guide motion technology, particularly to the field of vehicle interior space expansion technology and involves a combined guide mechanism and its application in a vehicle body slide-out system.

BACKGROUND OF THE INVENTION

Linear guides are used in situations requiring linear reciprocating motion. They can withstand a certain amount of torque and achieve high-precision linear motion under heavy loads, making them widely applicable in various scenarios.

Pattern US2022205482A1 discloses a linear motion device where the rolling elements, such as balls, are arranged inside the slider rather than within the rail. This results in a larger slider volume and necessitates the use of a positioning and retention device for the rolling elements. There is also an issue with the balls potentially falling out, which requires specialized personnel for installation.

Existing vehicles and RVs incorporate slide-out boxes to increase the usable interior space of the RV. The outer wall of the slide-out box is flush with the exterior of the vehicle during driving. When the vehicle is stationary, the slide-out box extends from the opening of the vehicle, thereby increasing the internal usable space of the vehicle.

Pattern US201615339481A discloses a device with the slide-out mechanism positioned below the vehicle body, which is not integrated, resulting in occupying a large space, inconvenience for installation, and unstable operation.

Pattern US202117408020A discloses a slide-out device positioned on both sides of the slide-out box. Due to the complexity of the mechanism, the height of the telescopic drive device is excessively high, occupying a large space, being inconvenient to maintain, and increasing the cost of use.

In view of the related technologies mentioned above, the inventor believes that there are some shortcomings in the traditional linear guide rail, and the telescopic mechanism of the vehicle slide-out box is relatively bulky, complex to install, and costly. Therefore, it is considered that the traditional linear guide rail and the telescopic mechanism of the vehicle slide-out box have the problems of large space occupation, difficult installation and inconvenience in use.

SUMMARY OF THE INVENTION

To address the shortcomings of linear guide slider mechanism and the problem of large space occupation and difficult installation of the slide-out mechanism for vehicle box systems, the present invention provides a combined guide rail mechanism and its application in vehicle slide-out systems. This combined guide rail mechanism is integrated, increasing the internal space of the vehicle. When used in vehicle slide-out systems, the combined guide rail mechanism, driving device, and part of the support frame are integrated within the bearing box, isolating the combined guide rail mechanism and driving device from external influences. This setup makes installation and dismantling convenient, enhances aesthetic appeal, and increases the vehicle's internal usable space

DETAILED DESCRIPTION OF THE PREFERRED EMBODIMENTS

Since the entire slide-out mechanism inside the bearing box is integrated and connected to the support frame base plate, there is no need to dismantle the lower chassis of the vehicle. Installation and dismantling are convenient; simply fixing the support frame base plate to the vehicle allows the entire slide-out box to be positioned at the vehicle's opening.

This application provides a combined guide rail mechanism for use in vehicle slide-out systems, adopting the following technical solutions:

A combined guide rail mechanism includes a guide rail, a first guide, and a second guide, with one side of the rail slidingly connected to the first guide and the other side slidingly connected to the second guide. And the guide rail is provided with circulating balls.

The combined guide rail mechanism slides parallel on the rail through the first and second guides. The first and second guides perform reciprocating linear motion on the guide rail, thereby enabling the carried object to make high-load and high-precision linear motion along the guides, achieving a two-stage telescopic effect to expand the usable space.

The first guide is equipped with a first guide groove, which is provided a first guide track at the top and bottom, respectively.

The rail slides in the first guide groove on the first guide tracks within the first guide, reducing sliding friction.

A first lubricating oil nozzle is provided within the first guide; there are first and second oil-retaining plates at both ends of the first guide. A first oil-guiding groove and a first lubricating oil pad are disposed on the upper first guide track; as well as a second oil-guiding groove and a second lubricating oil pad are provided on the lower first guide track.

The guide rail slides within the first guide groove in the first guide. Lubricating oil is supplied to the first guide tracks to reduce friction and extend the service life of the first guide tracks.

The second guide is equipped with a second guide groove, which includes a first and second end face of the second guide. And an upper second guide track and a lower second guide track are provided within the second guide groove.

The rail slides in the second guide groove on the second guide tracks within the second guide, reducing sliding friction.

A second lubricating oil nozzle is provided within the second guide; there are third and fourth oil-retaining plates at both ends of the second guide. Within the second guide tracks, there are a third oil-guiding groove and a third lubricating oil pad, as well as a fourth oil-guiding groove and a fourth lubricating oil pad.

The guide rail slides within the second guide groove in the second guide. Lubricating oil is supplied to the second guide tracks to reduce friction and extend the service life of the second guide tracks.

The rail includes a first metal plate, a second metal plate, and a third metal plate. Between the first and second metal plates, parallel multiple rows of first circulating ball tracks accommodate first circulating balls. Between the second and third metal plates, parallel multiple rows of second circulating ball tracks accommodate second circulating balls. The first circulating balls slide evenly in the first circulating ball tracks, partially exposed on the second guide tracks. The second circulating balls slide evenly in the second circulating ball tracks, partially exposed on the first guide tracks. The first metal plate has a first fixing hole, the second metal plate has a second fixing hole, and the third metal plate has a third fixing hole. The first, second, and third metal plates are clamped and fixed together through the first, second, and third fixing holes.

The first circulating balls slide evenly in the first circulating ball tracks, reducing sliding friction. The second circulating balls function similarly.

The first circulating ball tracks and first guiding lips on the first and second metal plates are matching halves, forming complete first circulating ball tracks and first guiding lips when combined. The first circulating ball diameter is smaller than the track diameter, ensuring they roll smoothly within the tracks. The second circulating ball tracks and lips function similarly.

The first circulating balls reduce friction within the tracks, facilitating the telescopic sliding of the combined guide rail mechanism. The second circulating balls function similarly, providing uniform load-bearing capacity and avoiding local overload or suspension, thus improving stability.

The first circulating ball tracks are equipped with multiple first oil channels, each of which is correspondingly arranged. These channels form half-shapes on both the first and second metal plates, coming together to form complete first oil channels. The same principle applies to the second oil channels.

The first circulating balls move within the first circulating ball tracks, and the second circulating balls move within the second circulating ball tracks, which reduces friction, facilitates the rolling of the balls, and extends the service life of the balls and the circulating ball tracks.

The first guide has a baffle fixing hole for fixing a first limit baffle, and a bolt control hole at the end of the first guide groove opposite the baffle fixing hole for fixing a bolt on the first guide. The third metal plate has a bolt control slot corresponding to the control bolt.

When the first guide slides outwards and the fixed bolt catches the bolt control slot, it drives the rail to slide. When the first guide retracts and the first limit baffle hits the rail, it drives the rail to retract.

One end of the first metal plate has a second limit baffle fixing hole for fixing a second limit baffle, and the other end has a third limit baffle fixing hole for fixing a third limit baffle.

When the combined guide rail mechanism slides out, the first guide slides a certain distance, and the fixed bolt on the first guide catches the bolt control slot on the rail, driving it to slide further until the second limit baffle on the rail hits the first end face of the second guide. When retracting, the first limit baffle on the first guide hits the other end of the rail, driving it to retract further until the third limit baffle on the rail hits the second end face of the second guide.

A vehicle box slide-out system includes a combined guide rail mechanism, a driving device, a support frame, a bearing box, and a slide-out box. The combined guide rail mechanism includes a first guide, a rail, and a second guide, with one side of the rail slidingly connected to the first guide and the other side slidingly connected to the second guide. The first guide is fixed to the bearing box, and the second guide is fixed to the support frame. An upper side of the driving device is fixed to the bearing box, a lower side of the driving device is fixed to the support frame, and the support frame is fixed to a vehicle body. The bottom of the bearing box has a long opening, allowing it to slide back and forth on the lower end of the support frame.

The combined guide rail mechanism, driving device, and part of the support frame are integrated within the bearing box, isolating the combined guide rail mechanism and driving device from external influences. This setup makes installation and dismantling convenient, enhances aesthetic appeal, and increases the vehicle's internal usable space.

The driving device includes a rack, a driving seat, a motor, a reducer, a gear, and a rack frame. The motor is mounted on the driving seat, with the output shaft of the motor connected to the reducer. The output shaft of the reducer is connected to the gear, with the motor driving the gear via the reducer. The gear's tooth surface meshes with the rack's tooth surface. The driving seat, motor, reducer, and gear are fixed to the support frame. The rack is installed on the rack frame, which is fixed to the bearing box, converting the gear's rotational motion into the rack's linear motion.

The driving device converts the gear's rotational motion into the rack's linear motion, driving the slide-out box in and out.

The support frame includes a top plate, a vertical plate, and a bottom plate.

The support frame's bottom plate can bear the entire weight of the slide-out box and transfer this weight to the vehicle body. The bearing box's long opening slides back and forth through the support frame's vertical plate.

Based on the description above, the present application includes the following beneficial technical effects:

1. The first and second guides of the combined guide rail mechanism perform reciprocating linear motion on the guide rail.

2. The combined guide rail mechanism can achieve two-stage telescopic movement, enabling the carried object to make high-load and high-precision linear motion along the guides.

3. Integrating the combined guide rail mechanism, driving device, and part of the support frame within the bearing box isolates them from external influences, making installation and dismantling convenient, enhancing aesthetic appeal, and increasing the vehicle's internal usable space.

4. Since the entire combined guide rail mechanism within the bearing box is integrated and connected to the support frame, there is no need to dismantle the lower chassis of the vehicle. Installation is convenient; simply fixing the support frame base plate to the vehicle allows the entire slide-out box to be positioned at the vehicle's opening.

BRIEF DESCRIPTION OF DRAWINGS

FIG. 6A is a schematic diagram of the fully retracted combined guide rail mechanism in the specific embodiment of the present invention.

FIG. 6B is a schematic diagram of the partially extended combined guide rail mechanism in the specific embodiment of the present invention.

FIG. 6C is a schematic diagram of the fully extended combined guide rail mechanism in the specific embodiment of the present invention.

Figure 1A:
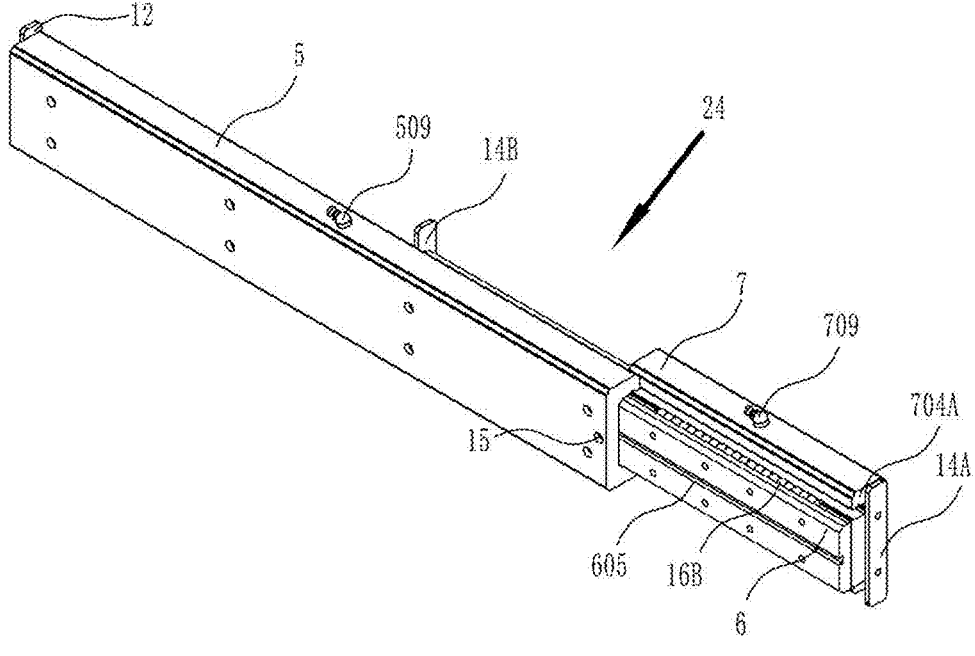
FIG. 1A is a schematic diagram of the fully extended combined guide rail mechanism in the specific embodiment of the present invention.

Follow are the reference numbers appear in the drawings:
1 Slide-out box;
2 Bearing box;
3 Support frame, 301 Bottom plate, 302 Top plate, 303 Vertical plate;
4 Rack;

5 First guide, 501 First guide groove, 502 First limit baffle fixing hole, 503 First guide track, 504 Bolt control hole, 505 First guide assembly hole, 506A First oil-retaining plate, 506B Second oil-retaining plate, 507A First oil-guiding groove, 507B Second oil-guiding groove, 508A First lubricating oil pad, 508B Second lubricating oil pad, 509 First lubricating oil nozzle;
6 Guide rail, 601 First metal plate, 602 Second metal plate, 603 Third metal plate, 604A First circulating ball track, 604B Second circulating ball track, 605 Bolt control slot, 606A First fixing hole, 606B Second fixing hole, 606C Third fixing hole, 607A Second limit baffle fixing hole, 607B Third limit baffle fixing hole, 608A First oil channel, 608B Second oil channel;
7 Second guide, 701 Second guide groove, 702 Second guide assembly hole, 703 Second guide track, 704A First end face, 704B Second end face, 706A Third oil-retaining plate, 706B Fourth oil-retaining plate, 707A Third oil-guiding groove, 707B Fourth oil-guiding groove, 708A Third lubricating oil pad, 708B Fourth lubricating oil pad, 709 Second lubricating oil nozzle;
8 Gear;
9 Gear rack frame;
10 Motor;
11 Driving seat;
12 First limit baffle;
13 Reducer;
14A Second limit baffle, 14B Third limit baffle;
15 Bolt;
16A First circulating ball, 16B Second circulating ball;
17A First guide lip, 17B Second guide lip;
18 Long opening;
19 First guide fixing hole;
20 Rack frame fixing hole;
21 Second guide fixing hole;
22 Bolt mounting hole;
23 Driving device;
24 Combined guide rail mechanism;
25 Vehicle body.

DETAILED DESCRIPTION OF THE INVENTION

To make the objectives, features, and advantages of the present invention more apparent and understandable, the following will describe the technical solutions of the present invention in detail and completely with reference to the drawings in the specific embodiments. It is evident that the described embodiments are only part of the embodiments of the present invention and not all of them. Based on the embodiments in this patent, all other embodiments obtained by those skilled in the art without creative work fall within the scope of protection of this patent.

Figure 1B:
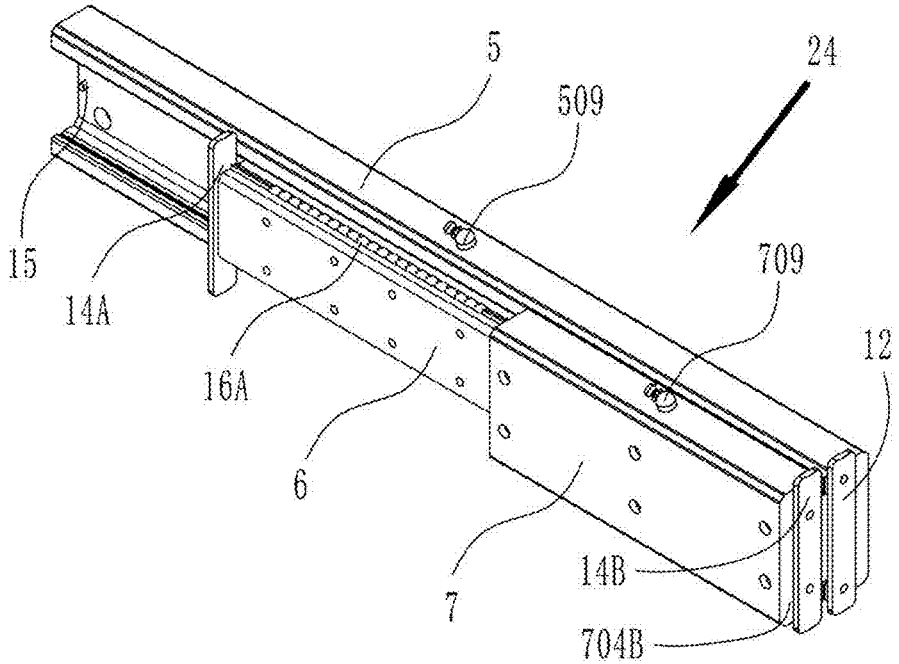
FIG. 1B is a schematic diagram of the retracted combined guide rail mechanism in the specific embodiment of the present invention.

Referring to FIG. 1, a combined guide rail mechanism 24 includes a first guide 5, a guide rail 6, and a second guide 7. FIG. 1A is a schematic diagram of the fully extended combined guide rail mechanism, and FIG. 1B is a schematic diagram of the combined guide rail mechanism in the retracted state. Inside the guide rail 6, there are first circulating balls 16A and second circulating balls 16B. The guide rail 6 has a second limit baffle 14A and a third limit baffle 14B at both ends. The first guide 5 and the guide rail 6 are slidably connected through the second circulating balls 16B, and the second guide 7 and the guide rail 6 are slidably connected through the first circulating balls 16A. Together, the first guide 5, guide rail 6, and second guide 7 form the combined guide rail mechanism 24.

Figure 2:
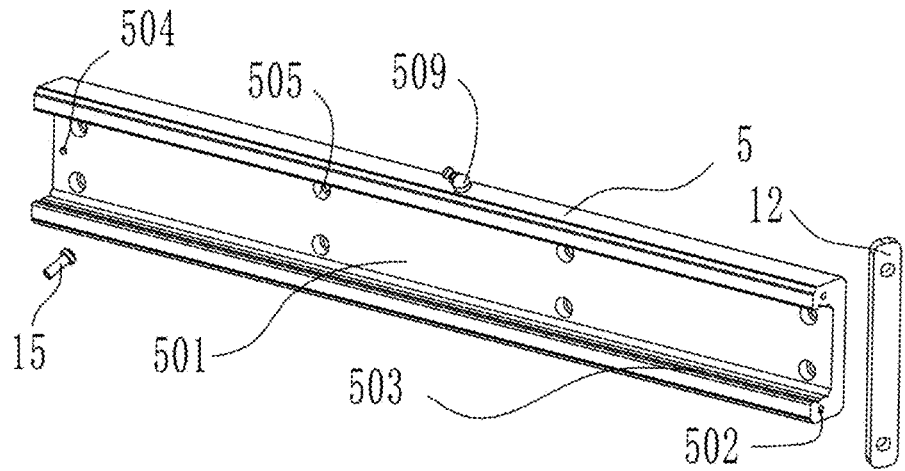
FIG. 2 is a schematic diagram of the first guide structure in the specific embodiment of the present invention.

Referring to FIG. 2, inside the first guide 5 is a first guide groove 501. One end of the first guide 5 is provided with a first limit baffle fixing hole 502 for fixing the first limit baffle 12. An upper first guide track 503 and a lower first guide track 503 are disposed within the first guide groove 501. A bolt control hole 504 is provided at the end of the first guide groove 501 far from the first limit baffle fixing hole 502 to fix a bolt 15 on the first guide 5. The side of the first guide 5 is provided with assembly holes 505, and the first lubrication oil nozzle 509.

Figure 3:
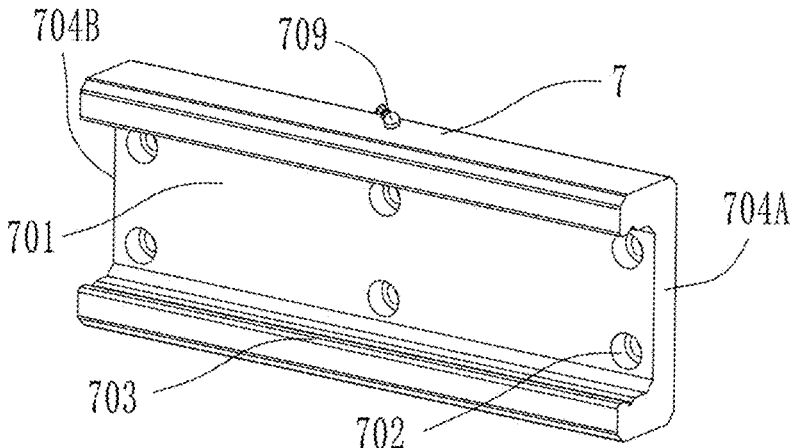
FIG. 3 is a schematic diagram of the second guide structure in the specific embodiment of the present invention.

Referring to FIG. 3, inside the second guide 7 is a second guide groove 701. The second guide groove 701 includes a first end face 704A and a second end face 704B of the second guide. An upper second guide track 703 and a lower second guide track 703 are provided within the second guide groove 701. The side of the second guide 7 is provided with assembly holes 702, and the second lubrication oil nozzle 709.

Figure 4A:
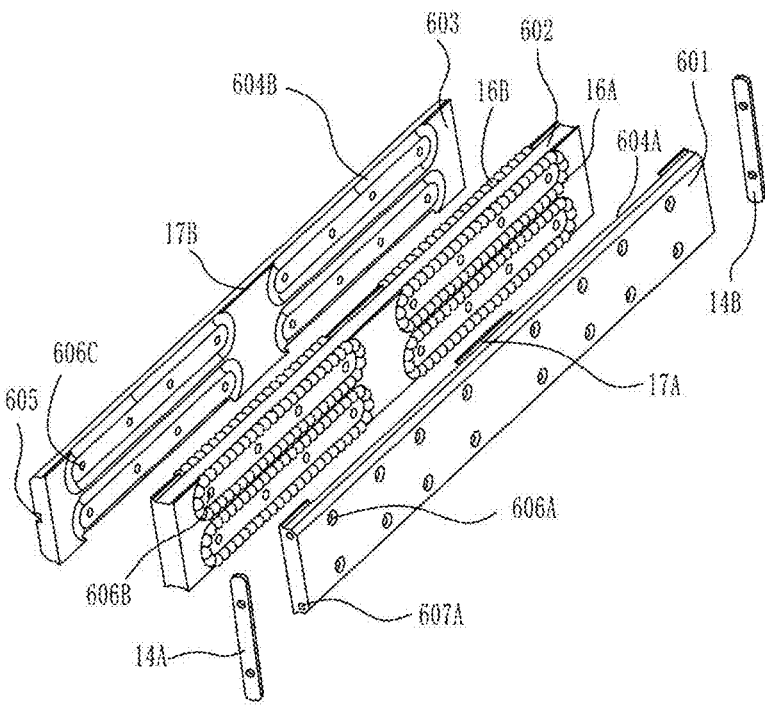
FIG. 4A is a front view of the internal structure of the guide rail in the specific embodiment of the present invention.
Figure 4B:
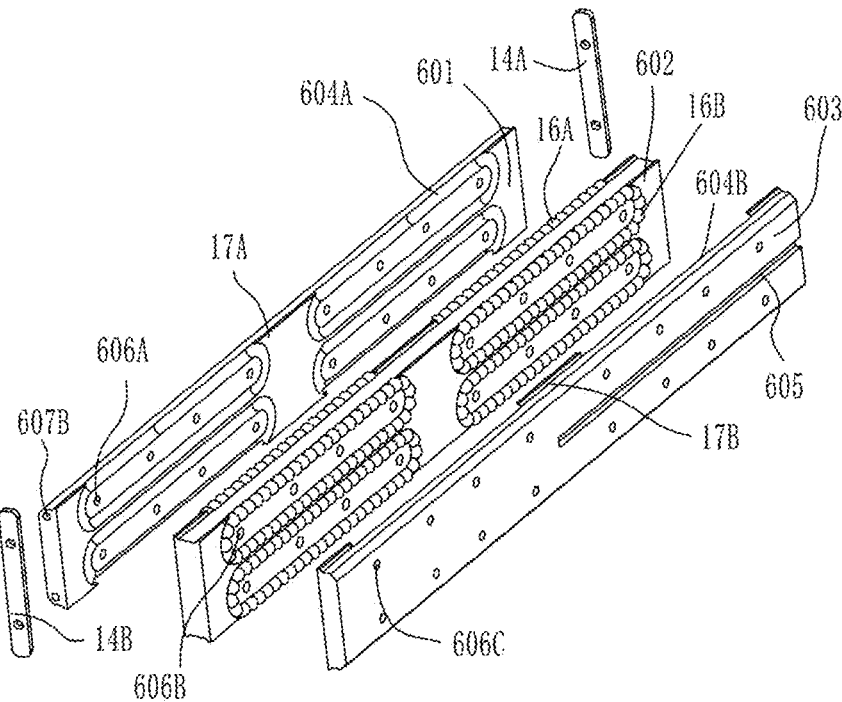
FIG. 4B is a rear view of the internal structure of the guide rail in the specific embodiment of the present invention.
Figure 5A:
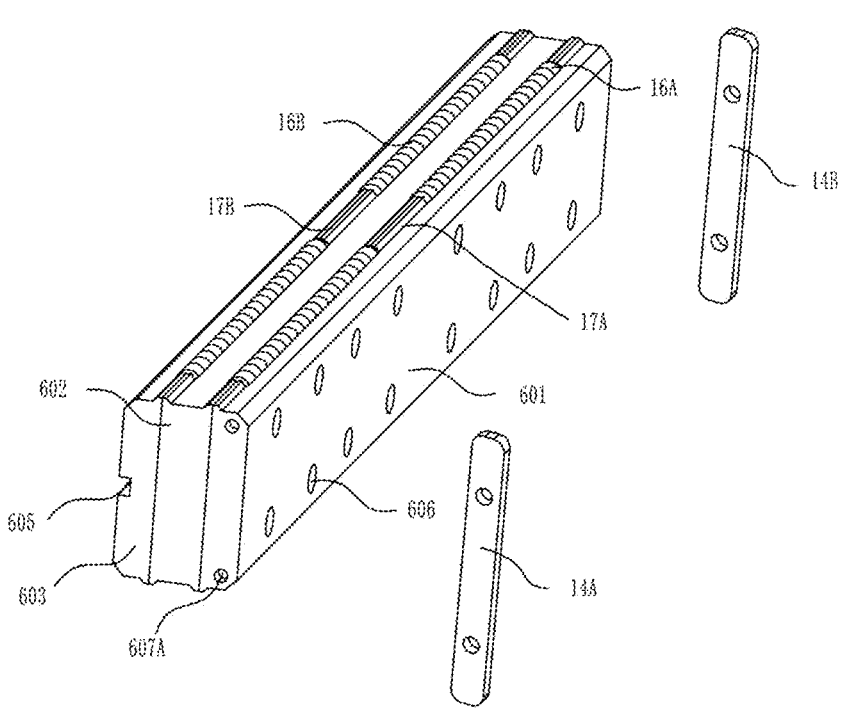
FIG. 5A is a front view of the overall external structure of the guide rail in the specific embodiment of the present invention.
Figure 5B:
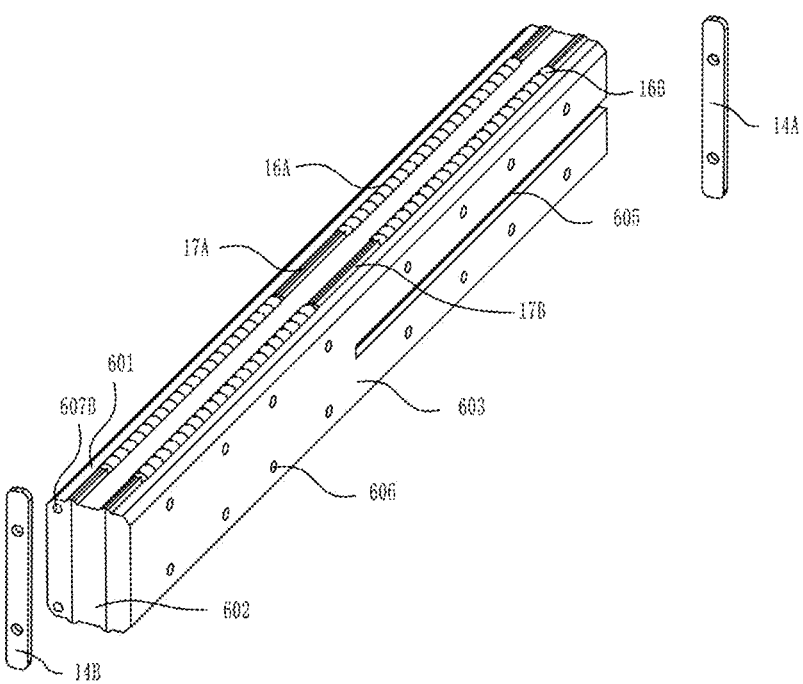
FIG. 5B is a rear view of the overall external structure of the guide rail in the specific embodiment of the present invention.

Referring to FIGS. 4 and 5, the guide rail 6 includes a first metal plate 601, a second metal plate 602, and a third metal plate 603. Between the first metal plate 601 and the second metal plate 602, there are two parallel rows of first circulating ball tracks 604A for accommodating the first circulating balls 16A. Between the second metal plate 602 and the third metal plate 603, there are two parallel rows of second circulating ball tracks 604B and two parallel first guide lips 17A for accommodating the second circulating balls 16B. The first circulating ball tracks 604A and first guide lips 17A on the first metal plate 601 and the second metal plate 602 are corresponding halves that combine to form the complete first circulating ball tracks 604A and first guide lips 17A. The diameter of the first circulating balls 16A is smaller than that of the first circulating ball tracks 604A, and the first circulating ball tracks 604A and first guide lips 17A hold the first circulating balls 16A, allowing them to circulate and roll within. The first circulating balls 16A roll evenly in the first circulating ball tracks 604A, with part of the balls' surfaces exposed to slide on the second guide tracks 703. The second circulating balls 16B, second circulating ball tracks 604B, and second guide lips 17B operate similarly.

The first metal plate 601 has a first fixing hole 606A, the second metal plate 602 has second fixing holes 606B, and the third metal plate 603 has third fixing holes 606C. The first metal plate 601, second metal plate 602, and third metal plate 603 are clamped and fixed together through the first fixing hole 606A, second fixing hole 606B, and third fixing hole 606C, allowing the first circulating balls 16A and second circulating balls 16B to have their surfaces exposed for easy sliding.

The first metal plate 601 has second limit baffle fixing holes 607A for fixing the second limit baffle 14A at one end and third limit baffle fixing holes 607B for fixing the third limit baffle 14B at the other end. The third metal plate 603 has a bolt control slot 605 corresponding to the bolt 15 on the first guide 5.

Referring to FIGS. 6A, 6B, and 6C, the guide rail 6 is slidably connected to the first guide 5 through the second circulating balls 16B between the third metal plate 603 and the second metal plate 602 and is slidably connected to the second guide 7 through the first circulating balls 16A between the first metal plate 601 and the second metal plate 602.

Referring to FIG. 6A, it shows the fully retraction state of the combined guide rail mechanism 24.

Referring to FIG. 6B, it shows the combined guide rail mechanism 24 in the process of sliding out. When the combined guide rail mechanism 24 slides out, the first guide 5 slides a certain distance, and when the bolt 15 on the first guide 5 engages the bolt control slot 605 on the third metal plate 603 of the guide rail 6, the first guide 5 drives the guide rail 6 to slide out. After sliding a certain distance, when the second limit baffle 14A on the first metal plate 601 of the guide rail 6 contacts the first end face 704A of the second guide, the sliding process ends, achieving a two-stage extension as shown in FIG. 6C.

Figures 7A, 7B, 7C:
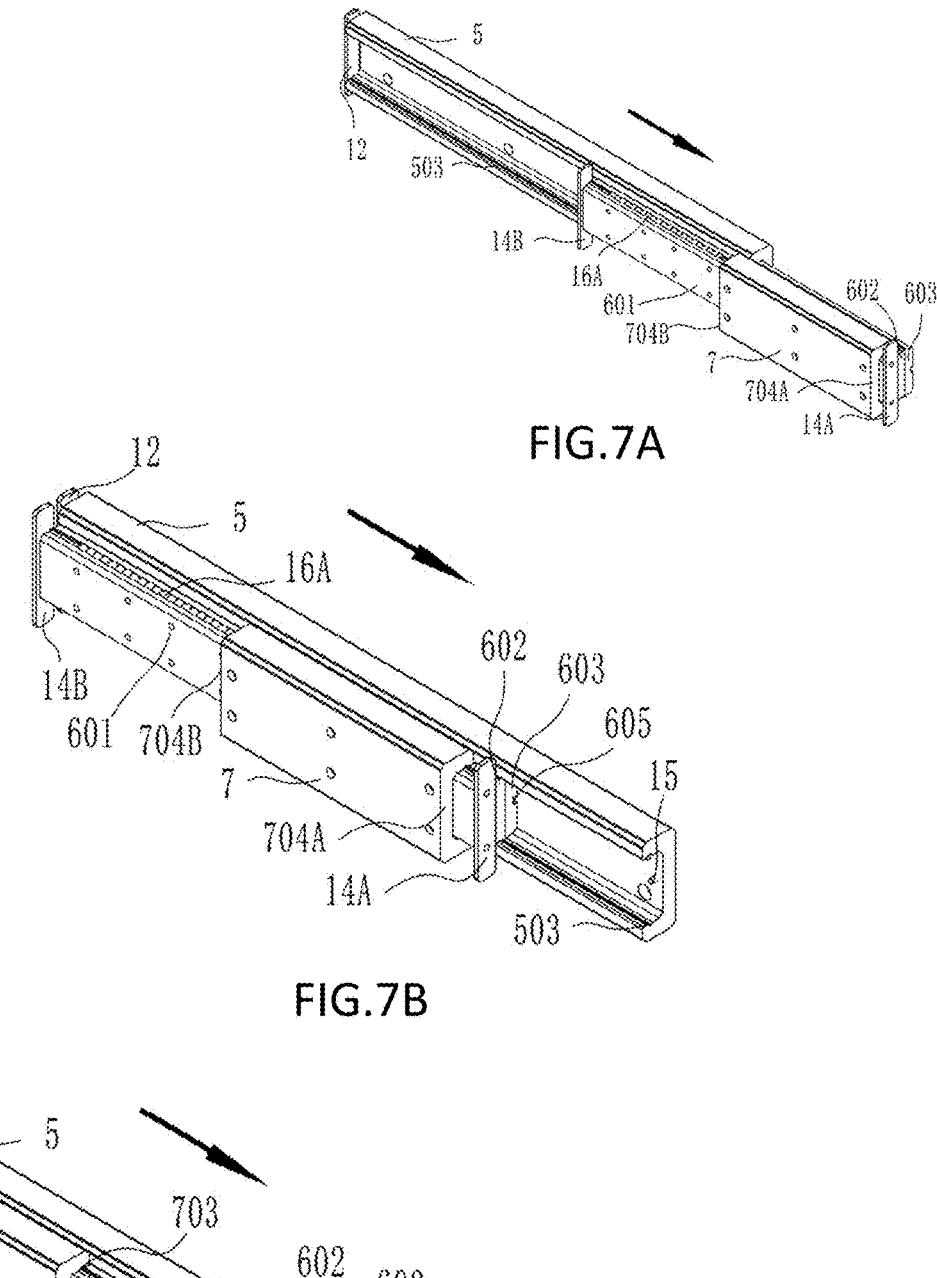
FIG. 7A is a schematic diagram of the fully extended combined guide rail mechanism in the specific embodiment of the present invention.
FIG. 7B is a schematic diagram of the partially retracted combined guide rail mechanism in the specific embodiment of the present invention.
FIG. 7C is a schematic diagram of the fully retracted combined guide rail mechanism in the specific embodiment of the present invention.

Referring to FIG. 7A, it shows the fully extended state of the combined guide rail mechanism 24.

Referring to FIG. 7B, when the combined guide rail mechanism 24 retracts, and the first limit baffle 12 on the first guide 5 contacts the guide rail 6 at the third metal plate 603, it drives the guide rail 6 to move inward. When the third limit baffle 14B on the first metal plate 601 of the guide rail 6 contacts the second end face 704B of the second guide, the retraction process ends, achieving a two-stage retraction as shown in FIG. 7C.

Figure 8:
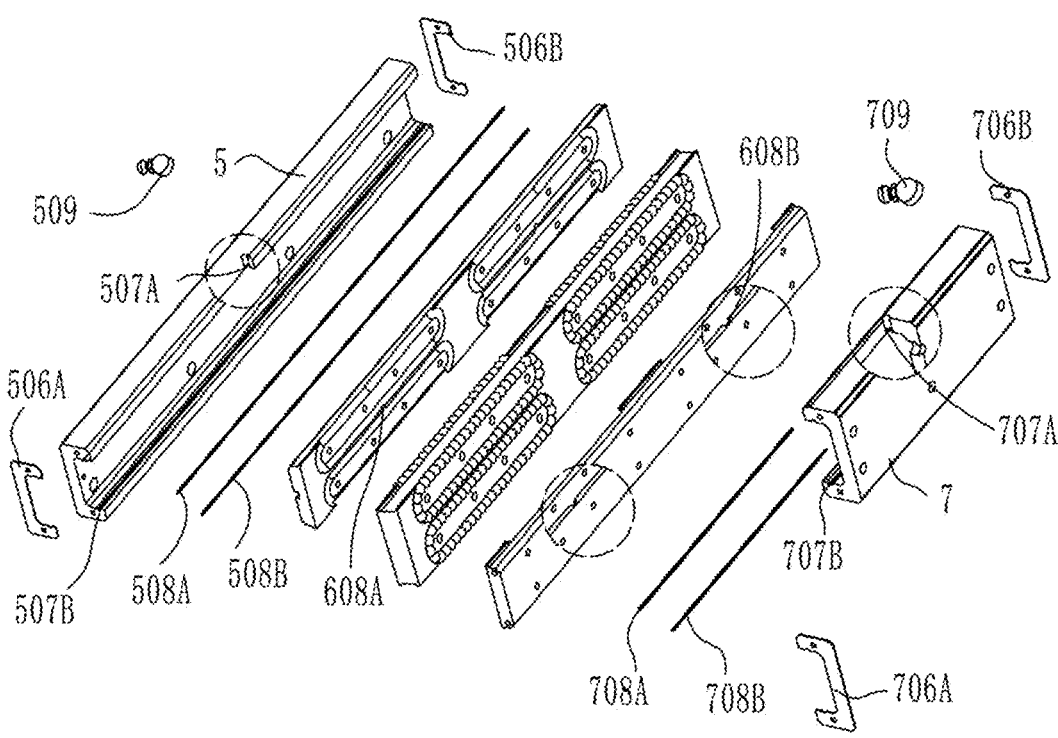
FIG. 8 is an explosion diagram of the lubrication system of the combined guide rail mechanism in the specific embodiment of the present invention.

Referring to FIG. 8, when the combined guide rail mechanism is stationary and lubricating the first guide track 503, the first circulating balls 16A, and the first circulating ball track 604A, lubricating oil is injected from the first lubrication oil nozzle 509 on the first guide 5. The lubricating oil flows into the first oil-guiding groove 507A and the first guide track 503. Then the first circulating balls 16A are coated with lubricating oil, and the excess oil passes through the first oil channel 608A. It then enters the lower first circulating ball track, where the lower first circulating balls are also lubricated, and the remaining lubricating oil flows into the second oil-guiding groove 507B. The first oil-retaining plate 506A and the second oil-retaining plate 506B prevent the lubricating oil from overflowing. When the combined guide rail mechanism is in motion, the lubrication system continuously repeats these steps to achieve persistent lubrication. The lubrication of the second guide track 703, the second circulating balls 16B, and the second circulating ball track 604B follows the same principle.

Figure 9:
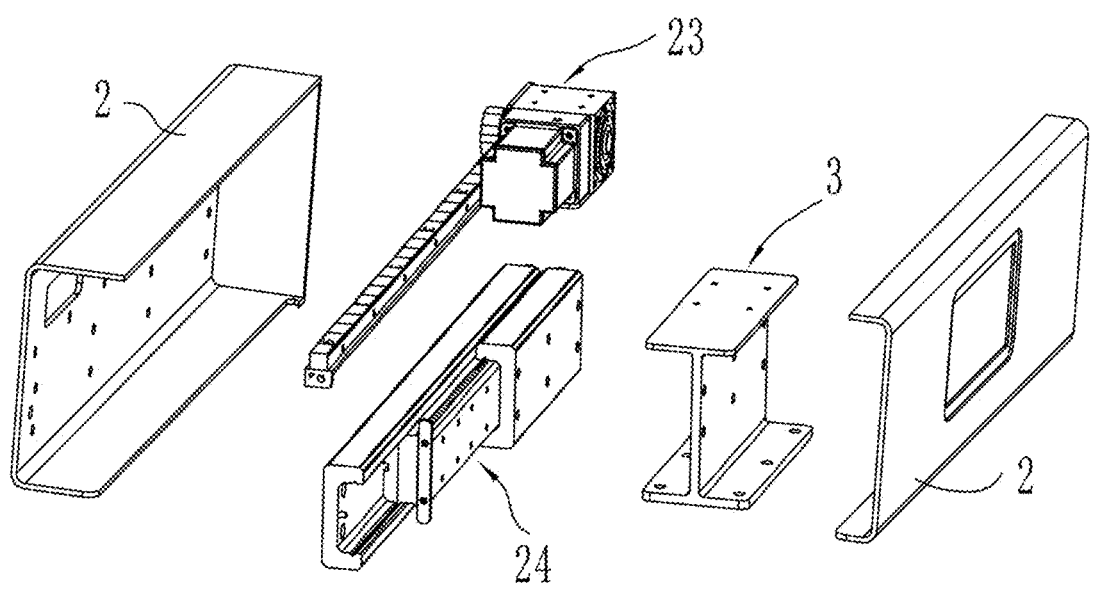
FIG. 9 is a schematic diagram of the vehicle box slide-out system in the specific embodiment of the present invention.
Figure 10:
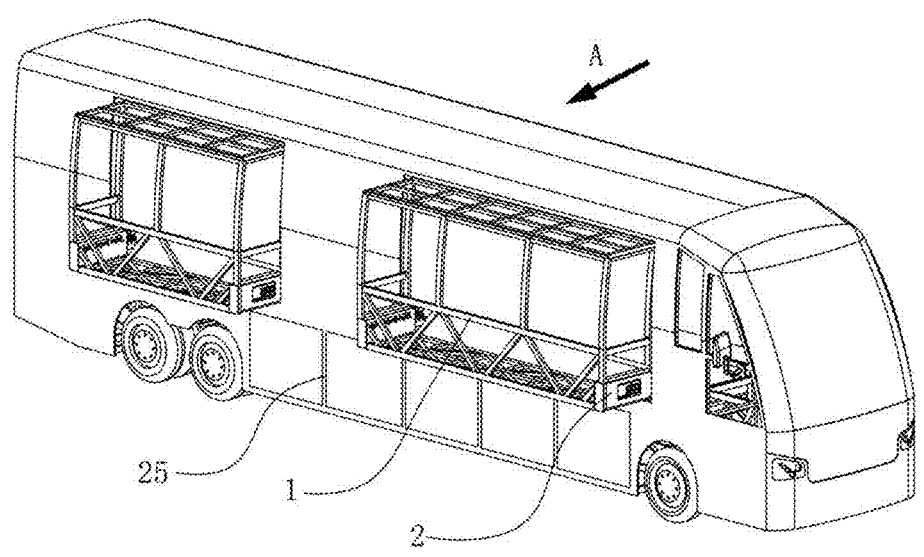
FIG. 10 is a schematic diagram of the fully extended vehicle slide-out box in the specific embodiment of the present invention.
Figure 11:
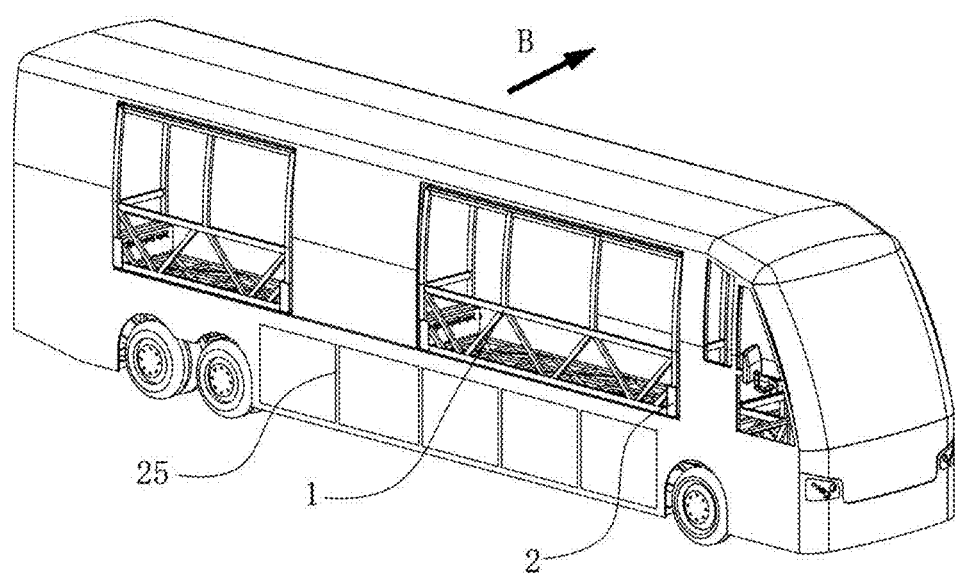
FIG. 11 is a schematic diagram of the fully retracted vehicle slide-out box in the specific embodiment of the present invention.

Referring to FIGS. 9, 10, and 11, a vehicle box slide-out system includes a combined guide rail mechanism 24, a driving device 23, a support frame 3, a bearing box 2, and a slide-out box 1. The slide-out box 1 is made of aluminum alloy or other materials with relatively light structural rigidity. The corresponding bearing boxes 2 are fixed at the lower part of the relative side walls of the slide-out box 1, with identical internal structures, synchronized movements, and support the weight of the slide-out box 1. The combined guide rail mechanism 24, driving device 23, and part of the support frame 3 are integrated inside the bearing boxes 2, saving space and allowing for quick installation and removal.

Figure 12:
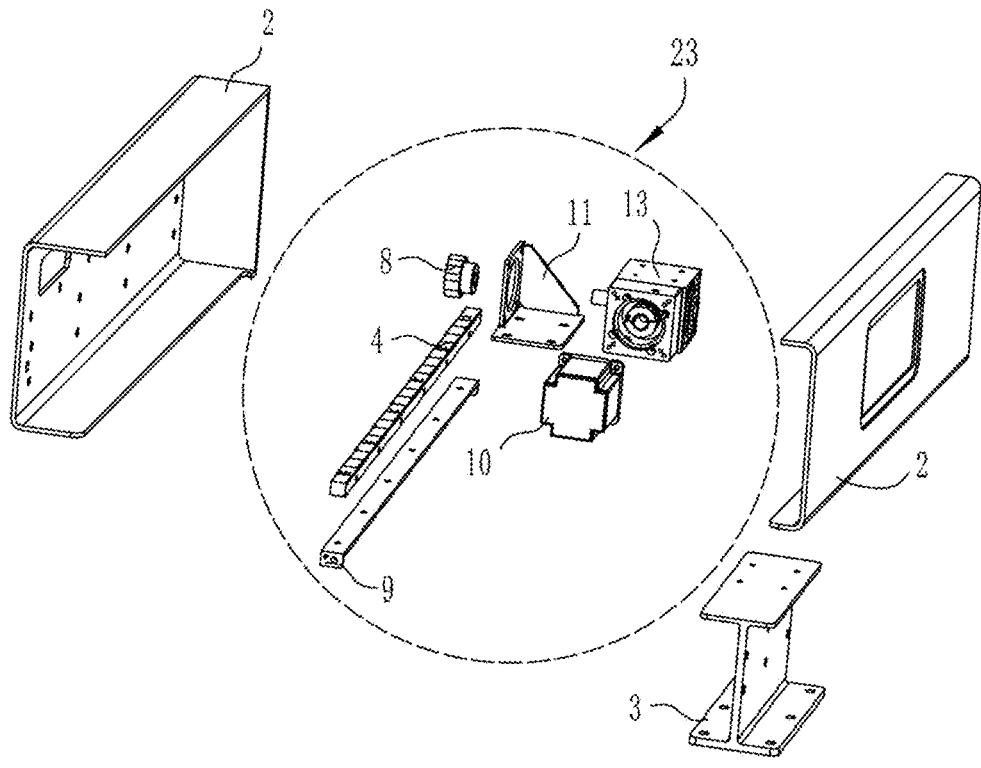
FIG. 12 is an exploded view of the driving device in the specific embodiment of the present invention.

Referring to FIG. 12, the driving device 23 includes a driving seat 11, motor 10, reducer 13, gear 8, rack 4, and rack frame 9. The motor 10 is installed on the driving seat 11, with the motor's 10 output shaft connected to the reducer 13, and the reducer's 13 output shaft connected to the gear 8. The gear 8 engages with the rack 4, which is fixed on the upper surface of the rack frame 9.

Figure 13:
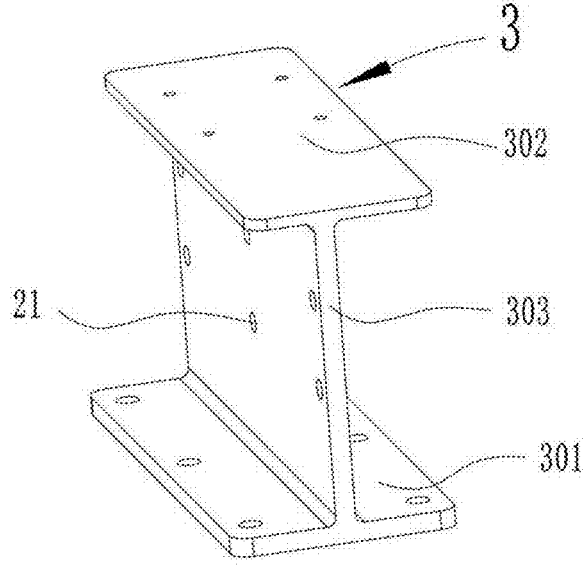
FIG. 13 is a schematic diagram of the support frame structure in the specific embodiment of the present invention.

Referring to FIG. 13, the support frame 3 includes a top plate 302, a vertical plate 303, and a bottom plate 301, with the vertical plate 303 provided with fixing holes 21 for the second guide.

Figure 14:
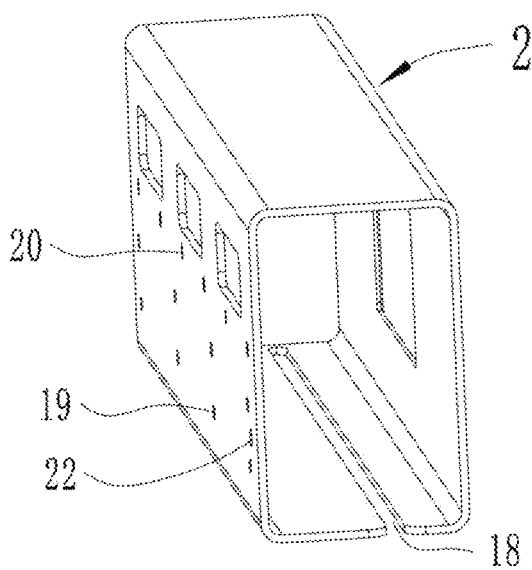
FIG. 14 is a schematic diagram of the box structure of the bearing box in the specific embodiment of the present invention.

Referring to FIG. 14, the side of the bearing box 2 is provided with fixing holes 19 for the first guide, fixing holes 20 for the rack frame, and bolt mounting holes 22, with a long opening 18 at the bottom.

Figure 15:
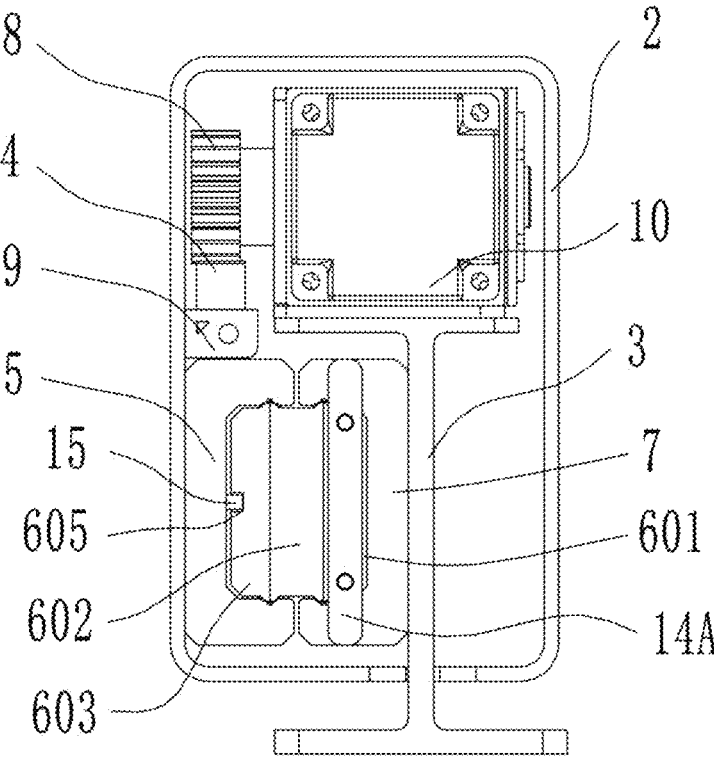
FIG. 15 is a front view of the internal structure of the bearing box in the specific embodiment of the present invention.
Figure 16:
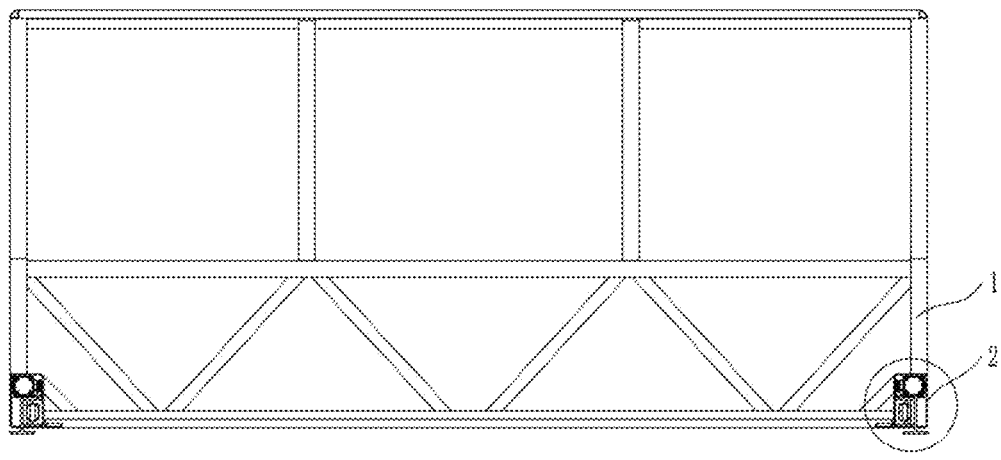
FIG. 16 is a front view of the slide-out box structure in the specific embodiment of the present invention.
Figure 17:
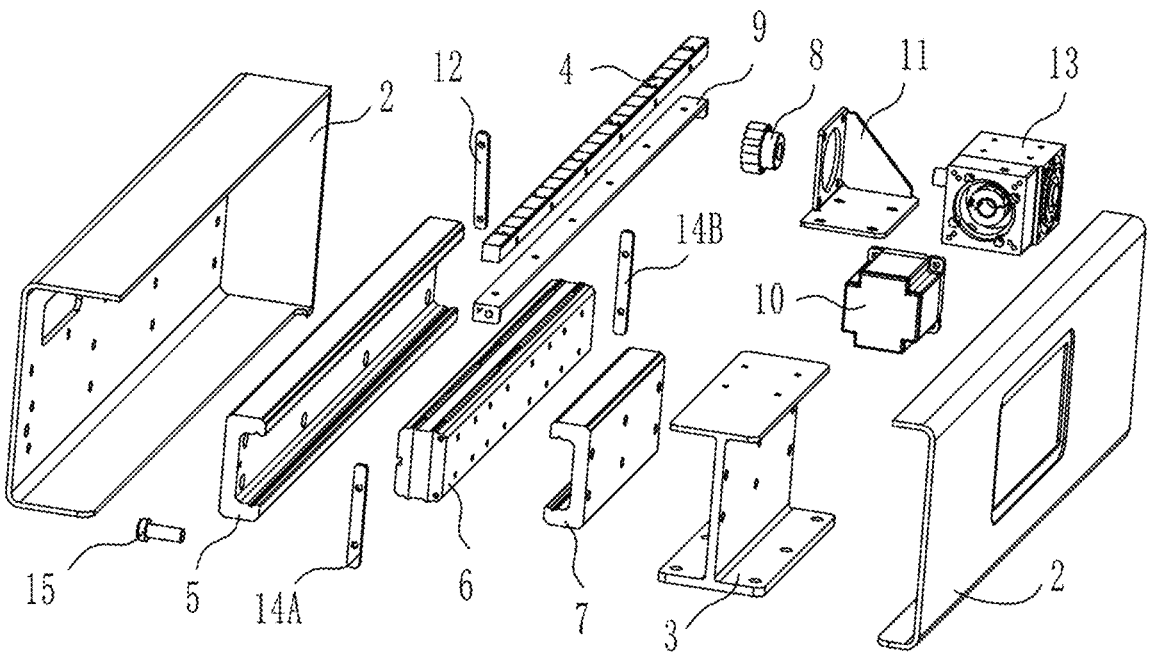
FIG. 17 is an exploded view of the vehicle box slide-out system in the specific embodiment of the present invention.

Referring to FIGS. 15, 16, and 17, Summarizing, the first guide 5 also has assembly holes 505, which is fixed to the bearing box 2 through corresponding fixing holes 19. The rack frame 9 is fixed to the bearing box 2 through fixing holes 20. The driving seat 11, motor 10, reducer 13, and gear 8 are fixed on the support frame 3. The bolt 15 is fixed to the first guide 5 through the bolt control hole 504. The second guide 7 is fixed to the support frame 3 through assembly holes 702 and fixing holes 21. The long opening 18 of the bearing box 2 allows sliding and retraction actions through the vertical plate 303 of the support frame 3. The combined guide rail mechanism 24 carries the weight of the bearing box 2, transferring the weight to the support frame 3, which in turn transfers the weight to a vehicle body 25.

Figure 18A:
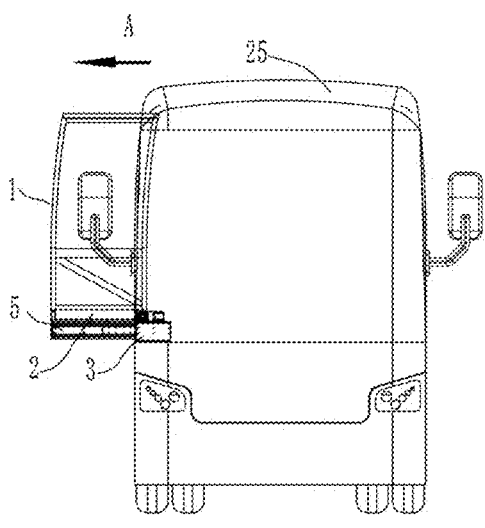
FIG. 18A is a front sectional view of the fully extended slide-out box in the specific embodiment of the present invention.
Figure 18B:
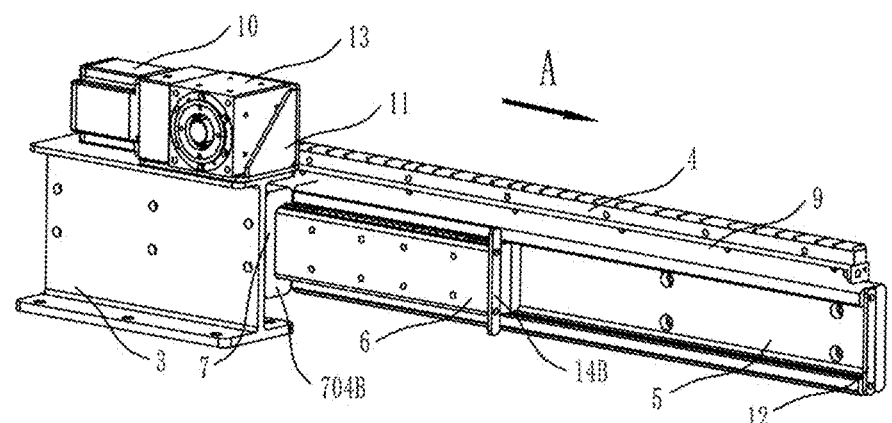
FIG. 18B is a front view of the fully extended slide-out box in the specific embodiment of the present invention.
Figure 18C:
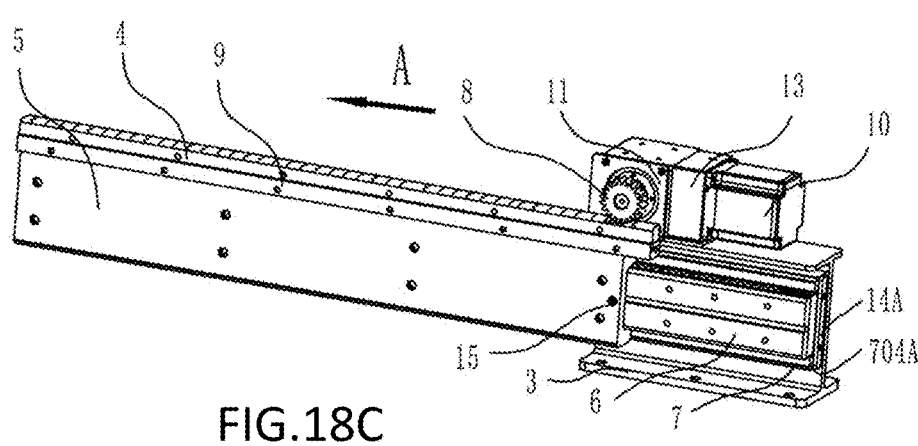
FIG. 18C is a rear view of the fully extended slide-out box in the specific embodiment of the present invention.

Referring to FIGS. 18A, 18B, and 18C, when the vehicle sliding system extends, the gear 8 rotates under the action of the reducer 13. The rack 4, driven by the gear 8, converts the rotary motion into linear motion. The rack frame 9 pulls the bearing box 2 to move, and the bearing box 2 in turn moves the first guide 5 outward. When the bearing box has extended a certain distance and the bolt 15 engages the bolt control slot 605, it causes the guide rail 6 to slide. The extension process ends when the second limit baffle 14A contacts the first end face 704A of the second guide, achieving two-stage extension. FIG. 18B shows a front view of the vehicle sliding system when it is fully extended, and FIG. 18C shows a rear view when the vehicle sliding system is fully extended.

Figure 19A:
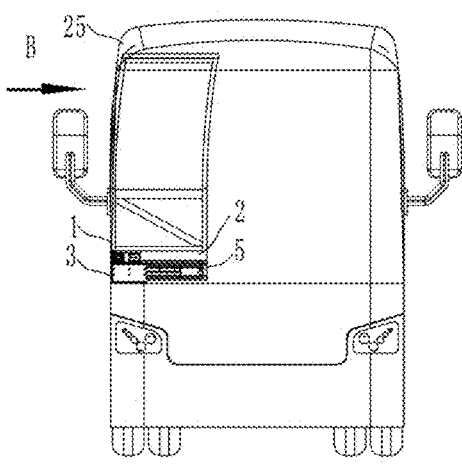
FIG. 19A is a front sectional view of the fully retracted slide-out box in the specific embodiment of the present invention.
Figure 19B:
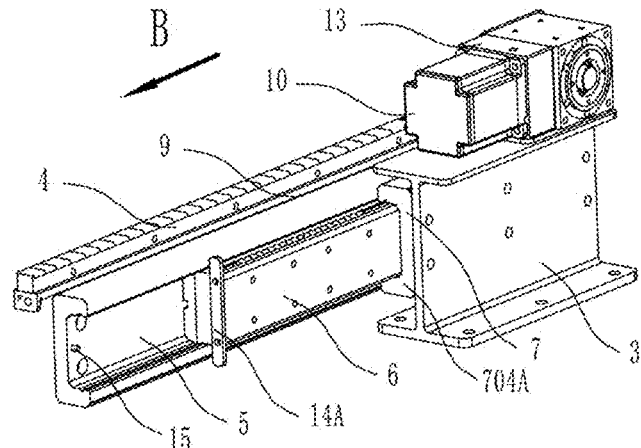
FIG. 19B is a front view of the fully retracted slide-out box in the specific embodiment of the present invention.
Figure 19C:
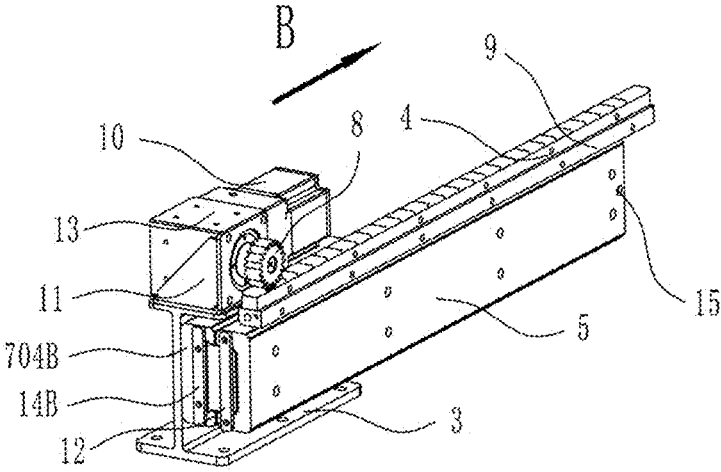
FIG. 19C is a rear view of the fully retracted slide-out box in the specific embodiment of the present invention.

Referring to FIGS. 19A, 19B, and 19C, when the vehicle sliding system retracts, the gear 8 rotates in reverse under the action of the reducer 13, driving the rack 4 and the rack frame 9 to pull the bearing box 2 inward. The bearing box 2 moves the first guide 5 inward. When the bearing box has been retracted a certain distance and the first limit baffle 12 contacts the guide rail 6, it causes the guide rail 6 to slide inward. The retraction process ends when the third limit baffle 14B contacts the first end face 704B of the second guide, achieving two-stage retraction. FIG. 19B shows a front view when the vehicle sliding system is fully retracted, and FIG. 19C shows a rear view when the vehicle sliding system is fully retracted.

The above description of the disclosed embodiments enables those skilled in the art to implement or use the invention. Various modifications to these embodiments will be readily apparent to those skilled in the art, and the general principles defined herein can be applied to other embodiments without departing from the spirit or scope of the invention. Therefore, the invention is not limited to the embodiments described herein but conforms to the widest scope consistent with the principles and novel features disclosed herein.

What is claimed is:
1. A combined guide rail mechanism comprising:
a guide rail equipped with parallel multi-row circulating balls and provided with a second limit baffle and a third limit baffle at both ends;
a first guide having a bolt on it; and
a second guide;
wherein one side of the guide rail is slidably connected to the first guide and the other side is slidably connected to the second guide;
wherein the first guide and the second guide perform reciprocating linear motion on the guide rails, enabling the load-bearing object to make high-load and high-precision linear motion along the first guide or the second guide;
wherein the combined guide rail mechanism can achieve two-stage telescopic motion.

2. The combined guide rail mechanism of claim 1, wherein the first guide is provided with a first guide groove, and an upper first guide track and a lower first guide track are disposed within the first guide groove.

3. The combined guide rail mechanism of claim 2, wherein a first oil-guiding groove and a first lubricating oil pad are disposed on the upper first guide track; as well as a second oil-guiding groove and a second lubricating oil pad are provided on the lower first guide track; a first oil-retaining plate and a second oil-retaining plate are disposed at opposite ends of the first guide; a first lubrication oil nozzle is disposed within the first guide.

4. The combined guide rail mechanism of claim 3, wherein the second guide is provided with a second guide groove, the second guide groove comprising a first end face and a second end face, and an upper second guide track and a lower second guide track are provided within the second guide groove.

5. The combined guide rail mechanism of claim 4, wherein the upper and lower second guide tracks there are a third oil-guiding groove and a third lubricating oil pad, as well as a fourth oil-guiding groove and a fourth lubricating oil pad; at both ends, there are a third oil-retaining plate and a fourth oil-retaining plate; inside the second guide, there is a second lubrication oil nozzle.

6. The combined guide rail mechanism of claim 5, wherein the guide rail comprises a first metal plate, a second metal plate, and a third metal plate, and upper and lower sides between the first metal plate and the second metal plate are provided with multiple first circulation ball tracks for accommodating first circulating balls, and upper and lower sides between the second metal plate and the third metal plate are provided with multiple second circulation ball tracks for accommodating second circulating balls, the first circulating balls slide evenly in the first circulation ball tracks, partially exposing the first circulating balls on the second guide track, and the second circulating balls slide evenly in the second circulation ball tracks, partially exposing the second circulating balls on the first guide track; the first metal plate is provided with first fixing holes, the second metal plate is provided with second fixing holes, and the third metal plate is provided with third fixing holes, the first metal plate, the second metal plate, and the third metal plate are clamped and fixed through the first fixing holes, the second fixing holes, and the third fixing holes.

7. The combined guide rail mechanism of claim 6, wherein the first circulation ball tracks on the first metal plate and the second metal plate are corresponding half shapes, the first metal plate and the second metal plate are combined to form complete first circulation ball tracks, the diameter of the first circulating balls is smaller than the diameter of the first circulation ball tracks, the first circulation ball tracks hold the first circulating balls, allowing the first circulating balls to roll in the first circulation ball tracks; the second circulation ball tracks and second guide lips are similarly structured.

8. The combined guide rail mechanism of claim 7, wherein one end of the first metal plate is provided with fixing holes to fix the second limit baffle, and the other end is provided with fixing holes to fix the third limit baffle.

9. The combined guide rail mechanism of claim 8, wherein one side of the first guide is provided with fixing holes for the first limit plate to fix the first limit plate, and one end of the first guide groove, away from the fixing holes for the first limit plate, is provided with a bolt control hole for fixing the bolt; the third metal plate is provided with a bolt control slot for positioning the bolt.

10. The combined guide rail mechanism of claim 9, wherein the first circulating ball tracks have multiple first oil channels, each of which is correspondingly arranged; these channels are half-shaped on both the first metal plate and the second metal plate, and when combined, they form complete multiple first oil channels; the second oil channels follow the same principle.

11. A vehicle box slide-out system comprising:

a slide-out box;

a support frame fixed on a vehicle body;

a bearing box, wherein the bottom of the bearing box is provided with a long opening, and the bearing box slides back and forth at the lower end of the support frame through the long opening; and the combined guide rail mechanism of claim 1, comprising the guide rail, the first guide which is fixed on the bearing box, and the second guide which is fixed on the support frame; and a driving device, having an upper side fixed to the bearing box and a lower side fixed to the support frame.

12. The vehicle box slide-out system of claim 11, wherein the driving device comprises a rack, a driving seat, a motor, a reducer, a gear, and a rack frame, the motor is installed on the driving seat, the output shaft of the motor is connected to the reducer, the output shaft of the reducer is connected to the gear, the motor drives the gear to rotate through the reducer, the tooth surface of the gear meshes with the tooth surface of the rack, the driving seat, the motor, the reducer, and the gear are fixed on the support frame, the rack is installed on the rack frame, the rack frame is fixed on the bearing box, and the rack and the gear mesh to convert the rotational motion of the gear into the linear motion of the rack.

13. The vehicle box slide-out system of claim 11, wherein the support frame comprises a top plate, a vertical plate, and a bottom plate.

\* \* \* \* \*